US005584323A

United States Patent [19]

Yamamuro

[11] Patent Number: 5,584,323

[45] Date of Patent: Dec. 17, 1996

[54] FLUID CONTROL VALVE

[75] Inventor: Sigeaki Yamamuro, Atsugi, Japan

[73] Assignee: Unisia Jecs Corporation, Kanagawa, Japan

[21] Appl. No.: 483,575

[22] Filed: Jun. 7, 1995

[30] Foreign Application Priority Data

Jun. 17, 1994 [JP] Japan .................................... 6-135339

[51] Int. Cl.$^{6}$ ........................... F15B 13/044; F16K 31/02

[52] U.S. Cl. ............................... 137/625.65; 251/129.07; 251/129.21; 251/282

[58] Field of Search ......................... 137/625.65, 625.69; 251/129.07, 129.21, 282

[56] References Cited

U.S. PATENT DOCUMENTS

| | | | |
|---|---|---|---|
| 1,820,653 | 8/1931 | Ernst | 251/282 X |
| 3,067,979 | 12/1962 | Cox | 251/282 |
| 3,260,501 | 7/1966 | Raymond | 251/282 |
| 3,370,613 | 2/1968 | Weaver | 251/282 X |
| 3,581,772 | 6/1971 | Wills | 137/625.69 |
| 3,912,222 | 10/1975 | Hayner | 251/282 |
| 4,917,150 | 4/1990 | Koch et al. | 137/625.65 |
| 5,419,369 | 5/1995 | House et al. | 137/625.65 |
| 5,445,189 | 8/1995 | Yamamuro | 137/625.65 |

FOREIGN PATENT DOCUMENTS 3-121386 5/1991 Japan .

*Primary Examiner*—Gerald A. Michalsky
*Attorney, Agent, or Firm*—Lowe, Price, LeBlanc & Becker

[57] ABSTRACT

In a fluid control valve, a valve spool doubling as a plunger of a solenoid is slidably installed on a shaft member, i.e., the valve spool and the shaft member are joined by providing therebetween an annular clearance. The shaft member is formed with three or more pressure chambers and radial restriction holes in constant communication with the pressure chambers. The pressure chambers and the radial restriction holes are arranged at equal circumferential intervals and in constant communication with an outside pressure source so that the annular clearance is maintained uniform, i.e., the valve spool is self-centered relative to the shaft member by the effect of the fluid pressure supplied to the pressure chambers at all times.

11 Claims, 8 Drawing Sheets

FLUID CONTROL VALVE

BACKGROUND OF THE INVENTION

1. Field of the Invention

The present invention relates to a fluid control valve for controlling the flow rate of fluid or the pressure of same.

2. Description of the Prior Art

Of fluid control valves, a hydraulic pressure control valve for controlling hydraulic pressure is heretofore known as for example disclosed in Japanese patent application provisional publication No. 3-121386.

This prior art hydraulic pressure control valve includes a plunger doubling as a valve spool. The plunger is slidable in a stationary body equipped with a solenoid. The stationary body is formed with an inlet side passage and an outlet side passage. The plunger is formed with a cut portion (i.e., control valve portion) for providing or blocking communication between the inlet side passage and the outlet side passage. The plunger is urged in the direction to block the above described communication under the bias of a spring and driven into a position for providing the above described communication by the solenoid and into a position for blocking the above described communication by the outlet side pressure.

However, in the above described prior art hydraulic pressure control valve, in order that the plunger (i.e., valve spool) can slide smoothly, it necessary to form a predetermined clearance between the joining circumferential surfaces of the plunger and an accommodation hole of the stationary body for slidably accommodating therein the plunger, thus causing a problem that the plunger becomes eccentric with the accommodation hole and thus the radial attracting forces of the solenoid becomes unbalanced to allow the plunger to be driven by a transversal force so that the hysteresis in the operation of the hydraulic control valve is enhanced, and that the plunger is liable to catch the accommodation hole due to its inclination and thus incapable of sliding smoothly.

Further, in the prior art hydraulic pressure control valve, the control valve portion is formed in a large diameter circumferential portion of the plunger, thus causing a problem that the amount of leakage fluid is large.

Further, in the prior art hydraulic pressure control valve, the cut portion (i.e., control valve portion) for providing or blocking communication between the inlet side passage and the outlet side passage, is a rectangular groove formed in the circumferential surface of the plunger. Such a rectangular groove can constitute part of a magnetic path during the time of energization of the solenoid and cause an axial attracting force which exerts a bad influence upon the hydraulic pressure control characteristic. In order to avoid this, it becomes necessary to make larger the axial length of the plunger so that the rectangular groove can be formed in the place apart from the magnetic path. For this reason, the following problems are caused.

(1) The axial length of the hydraulic pressure control valve becomes large so that there is a difficulty in making the control valve compact.

(2) The plunger and the stationary body for installation of the plunger are so long and complicated in shape, thus causing a high cost.

(3) The plunger becomes so long that the hysteresis in the operation of the hydraulic pressure control valve is enhanced and the responsibility of same is deteriorated.

SUMMARY OF THE INVENTION

According to an aspect of the present invention, there is provided a fluid control valve which comprises a stationary member, a spool slidable relative to said stationary member, a control valve portion for controlling fluid flow through a fluid flow passage, the control valve portion being formed in a sliding portion where the stationary member and the spool are slidingly engaged with each other by providing therebetween an annular clearance, and three or more communication holes for providing constant communication between the annular clearance and a portion of said fluid flow passage upstream of the control valve portion, arranged at equal intervals in the circumferential direction of the stationary member.

According to a further aspect of the present invention, the stationary member is constituted by a shaft member having the fluid passage, and the spool is constituted by a plunger of a solenoid, the plunger being slidably installed on an outer circumferential surface of the shaft member.

According to a further aspect of the present invention, there is provided a fluid control valve which comprises a stationary member having a fluid flow passage, a spool slidably installed on the stationary member by providing a clearance between the spool and the stationary member and cooperating with the stationary member to constitute therebetween control valve means for controlling fluid flow through the fluid flow passage, and three or more radial communication holes formed in the stationary member for providing constant communication between the clearance and a portion of the fluid flow passage upstream of the control valve portion, the communication holes being arranged at equal intervals in the circumferential direction of the stationary member.

According to a further aspect of the present invention, the stationary member is constituted by a shaft member, and the valve spool is slidable on an outer circumferential surface of the shaft member and constituted by a plunger of a solenoid.

According to a further aspect of the present invention, the shaft member has a plurality of pressure chambers in the form of depressions on the outer circumferential surface thereof the radial communication holes being in constant communication with the pressure chambers, respectively.

According to a further aspect of the present invention, the fluid flow passage includes an axial inlet passage section, an outlet passage section, a first radial port connected to the inlet passage section, and a second radial port connected to the outlet passage section, the control valve means including an annular groove formed in an inner circumferential surface of the valve spool for controlling communication between the first and second radial ports.

According to a further aspect of the present invention, the radial communication holes are in constant communication with the inlet passage section.

According to a further aspect of the present invention, the shaft member has a drain passage in the form of a groove formed in the outer circumferential surface thereof, the groove of the valve spool controlling communication between the second radial port and the drain passage.

According to a further aspect of the present invention, the solenoid includes a solenoid body portion to which the shaft member is fixedly attached and in which the valve spool is slidably installed, and a coil portion removably installed on the solenoid body portion.

According to a further aspect of the present invention, the annular groove of the valve spool has opposite axial ends of different pressure receiving areas.

According to a further aspect of the present invention, the annular groove of the valve spool has opposite axial ends of the same pressure receiving areas.

According to a further aspect of the present invention, there is provided a pressure control valve which comprises a stationary shaft member having a fluid flow passage, a spool slidably installed on the shaft member by providing a clearance between the spool and the shaft member and cooperating with the shaft member to constitute therebetween control valve means for controlling fluid pressure conducted through the fluid flow passage, and three or more radial communication holes formed in the shaft member for providing constant communication between the clearance and a portion of the fluid flow passage upstream of the control valve portion, the communication holes being arranged at equal intervals in the circumferential direction of the shaft member.

According to a further aspect of the present invention, there is provided a flow control valve which comprises a stationary shaft member having a fluid flow passage, a spool slidably installed on the shaft member by providing a clearance between the spool and the shaft member and cooperating with the shaft member to constitute therebetween control valve means for controlling a flow rate of fluid through the fluid flow passage, and three or more radial communication holes formed in the shaft member for providing constant communication between the clearance and a portion of the fluid flow passage upstream of the control valve portion, the communication holes being arranged at equal intervals in the circumferential direction of the shaft member.

The above structure is effective for solving the above noted problems inherent in the prior device.

It is accordingly an object of the present invention to provide a novel and improved fluid control valve which can assuredly prevent its plunger from moving into an eccentric position to catch its guide hole.

It is a further object of the present invention to provide a novel and improved fluid control valve of the above described character which can attain smooth movement of the plunger assuredly.

It is a further object of the present invention to provide a novel and improved fluid control valve of the above described character which can reduce the amount of leakage fluid through the clearance between the plunger and its guide member.

It is a further object of the present invention to provide a novel and improved fluid control valve of the above described character which makes it possible for its control valve portion and its magnetic path constituting portion to be arranged one above another in the radial direction of the plunger.

It is a further object of the present invention to provide a novel and improved fluid control valve of the above described character which can reduce the axial length of the plunger.

It is a further object of the present invention to provide a novel and improved fluid control valve of the above described character which can improve the responsiveness and can reduce the hysteresis.

It is a further object of the present invention to provide a novel and improved pressure control valve of the above described character.

It is a further object of the present invention to provide a novel and improved flow control valve of the above described character.

DETAILED DESCRIPTION OF THE PREFERRED EMBODIMENTS

Figure 1:
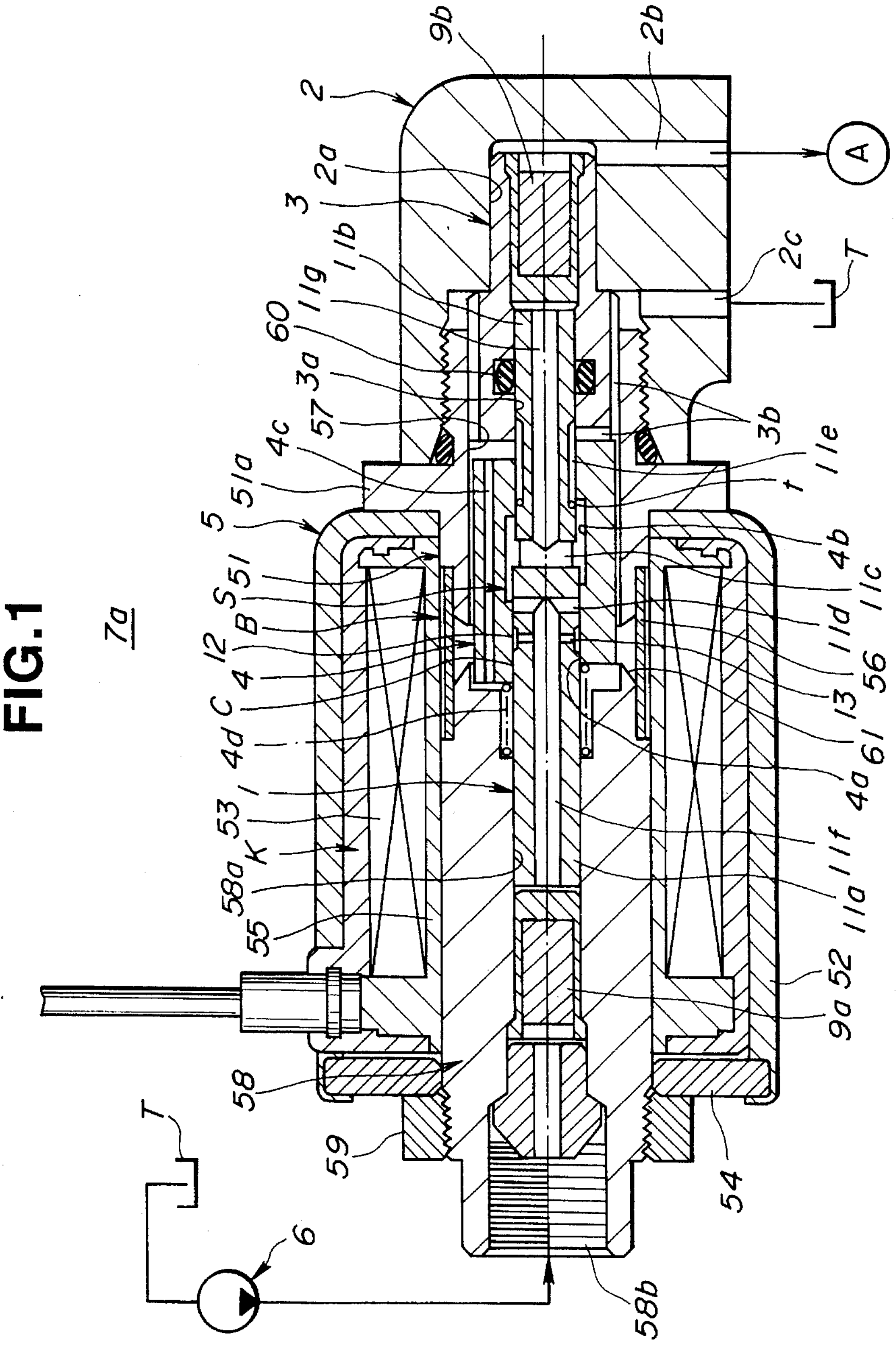
FIG. 1 is a longitudinal sectional view of a hydraulic pressure control valve according to an embodiment of the present invention, with a lower half being in a condition where its solenoid is deenergized and an upper half being in a condition where its solenoid is energized.

Referring first to FIGS. 1 to 4, a hydraulic pressure control valve embodying a fluid control valve of this invention is generally indicated by **7*a* and includes a solenoid 5. In FIG. 1, the upper half of the liquid pressure control valve 7*a* is shown as being in the condition of the solenoid 5 being energized and the lower half is shown as being in the condition of the solenoid 5** being deenergized.

The solenoid 5 consists of a solenoid body portion "B", a coil portion "K" and a valve spool 4 doubling as a plunger.

The solenoid body portion "B" is constructed of a base 51 and an attracting member 58 which are hollow cylindrical and arranged so as to oppose axially to each other, and an intermediate cylinder 56 fitted on and welded to the opposed peripheral end portions of the base 51 and the attracting member 58.

The coil portion "K" is constructed of a coil 53 for producing a magnetic field when energized, a bobbin 55 made up of a non-magnetic material and having wound thereon a coil 53, and a coil casing 52 for enclosing the bobbin 55. The coil portion "K" is removably installed on the solenoid body portion "B" The coil portion "K" abuts at one end thereof upon an outward flange **51*a* of the base 51 and is fastened to the solenoid body portion "B" by means of a fastening nut 59 which is screwed onto a threaded end portion of the attracting member 58 by way of a plate 54**.

The base 51 is formed with a central through hole 57 serving as a plunger chamber. A hollow cylindrical intermediate member 3 is fitted in the right-hand (in FIG. 1) end portion of the through hole 57. The base 51 has a threaded peripheral portion at a location more right-hand than the outward flange 51*a* and is screwed thereat into a valve body 2. The intermediate member 3 has a right-hand end portion which is inserted into a central opening 2*a* of the valve body 2 and fittingly engaged in the same. The valve body 2 has an output side outlet 2*b* for connection to an actuator "A" and a drain side outlet 2*c* for connection to a drain tank "T".

A shaft member 1 is disposed so as to extend through the central hole 57 of the base 51. The shaft member 1 is stepped to have a larger diameter portion 11*a* and a smaller diameter portion 11*b*. The larger diameter portion 11*a* is force-fitted in a central hole 58*a* of the attracting member 58 and thereby fixedly attached to same. The smaller diameter portion 11*b* is disposed in a central hole 3*a* of the intermediate member 3. An O-ring 60 is interposed between the smaller diameter portion 11*b* and the central hole 3*a* to provide a seal therebetween. The larger diameter portion 11*a* of the shaft member 1 is formed with a radial supply port 11*d* at a location adjacent a stepped portion of the shaft member 1. The supply port 11*d* is so formed as to penetrate radially through the shaft portion 11*a*. At a location next to the stepped portion, the smaller diameter portion 11*b* is formed with a radial output port 11*c*. The output port 11*c* is so formed as to penetrate radially through the small diameter portion 11*b*. The shaft member 1 further has a plurality of axial drain grooves 11e which are formed in the circumferential surface of the smaller diameter portion 11*b* at a location adjacent the output port 11*c*. The larger diameter portion 11*a* of the shaft member 1 is formed with a central supply side communication hole 11*f* for providing communication between an outside pressure source side connecting port 58*b* formed in the left-hand side end portion of the central opening 58*a* of the absorbing member 58 and the supply port 11*d*. The smaller diameter portion 11*b* is formed with a central output side communication hole 11*g* for providing communication between the output side connecting port 2*b* of the valve body 2 and the output port 11*c*. The outside pressure source side connecting port 58*b* is connected to an outside hydraulic pressure source 6.

The intermediate member 3 has communication grooves 3*b* which are formed in the plunger side end surface and the outer circumferential surface. The communication grooves 3*b* provide communication between the drain side connecting port 2*c* of the valve body 2 and the drain grooves 11*e* at all times. Filters 9*a* and 9*b* are respectively installed in the central hole 58*a* of the attracting member 58 and the central hole 3*a* of the intermediate member 3 for preventing intrusion of contaminant.

The valve spool 4 has a concentric valve hole 4*b* which is nonuniform in diameter so as to be fittable on the larger diameter portion 11*a* and smaller diameter portion 11*b* of the shaft member 1. The valve hole 4*b* has a stepped intermediate portion which is formed with a communication groove 4*b* in constant communication with the output port 11*c*. The communication groove 4*b* cooperates with the supply port 11*d* to form a supply side variable restriction portion "s" and with the drain groove 11*e* to form a drain side variable restriction portion "t".

The hydraulic pressure control valve 7*a* of this embodiment is constructed so as to produce a force which acts upon the valve spool 4 and urges the same in the right-hand direction in FIG. 1 in proportion to the output hydraulic pressure by the effect of the difference between the pressure receiving areas of the opposite axial end walls of the communication groove 4*b*. The valve spool 4 thus serves as a pressure differential-responsive piston.

When the valve spool 4 moves in the left-hand direction in FIG. 1, the discharge side variable restriction portion "t" is closed and the supply side variable restriction portion "s" is open, whereby the hydraulic pressure at the output port 11*c* is increased due to the supply of hydraulic pressure from the supply port 11*d* and the valve spool 4 is driven in the reverse direction, i.e., in the right-hand direction. By this, the supply side variable restriction portion "s" is closed and the discharge side variable restriction portion "t" is opened, whereby the hydraulic pressure at the output port 11*c* is decreased by the effect of the flow of the hydraulic pressure toward the discharge groove 11*e*.

The valve spool 4 is formed with a communication hole 4*c* penetrating axially thereof. The communication hole 4*c* allows the hydraulic fluid within the through hole 57 to flow out therefrom and thus makes it possible to attain smooth movement of the valve spool 4 within the through hole 57. The communication hole 4*c* also can serve as a damping orifice for suppressing excessive movement of the valve spool 4.

A return spring 4*d* in a loaded condition is interposed between the attracting member 58 and the valve spool 4. By the return spring 4*d*, the valve spool 4 is urged in the right-hand direction in FIG. 1. Accordingly, under a condition of the solenoid 5 being deenergized, the valve spool 4 is urged in the right-hand direction, thus causing the output hydraulic pressure at the output port 11*c* to become equal to the atmospheric pressure.

Figure 2:
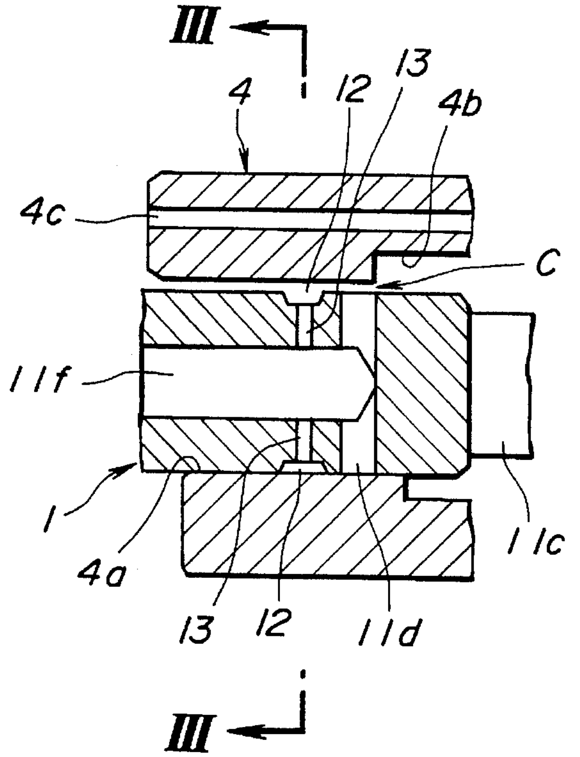
FIG. 2 is an enlarged sectional view of a novel, important portion of the hydraulic pressure control valve of FIG. 1.
Figure 3:
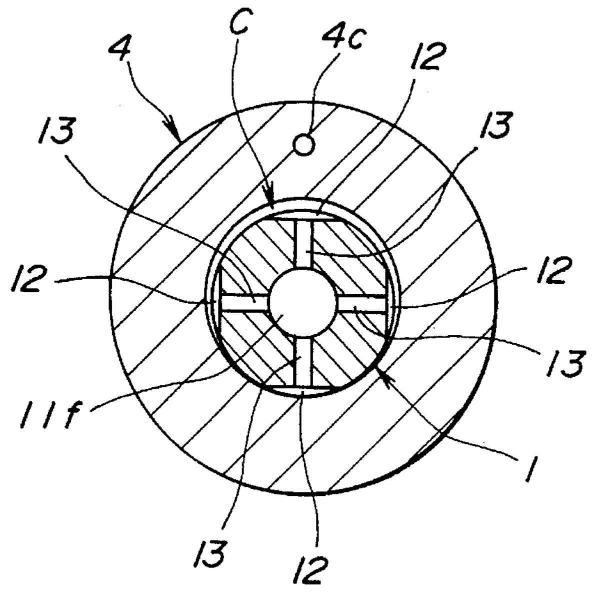
FIG. 3 is a sectional view taken along the line III—III of FIG. 1.
Figure 4:
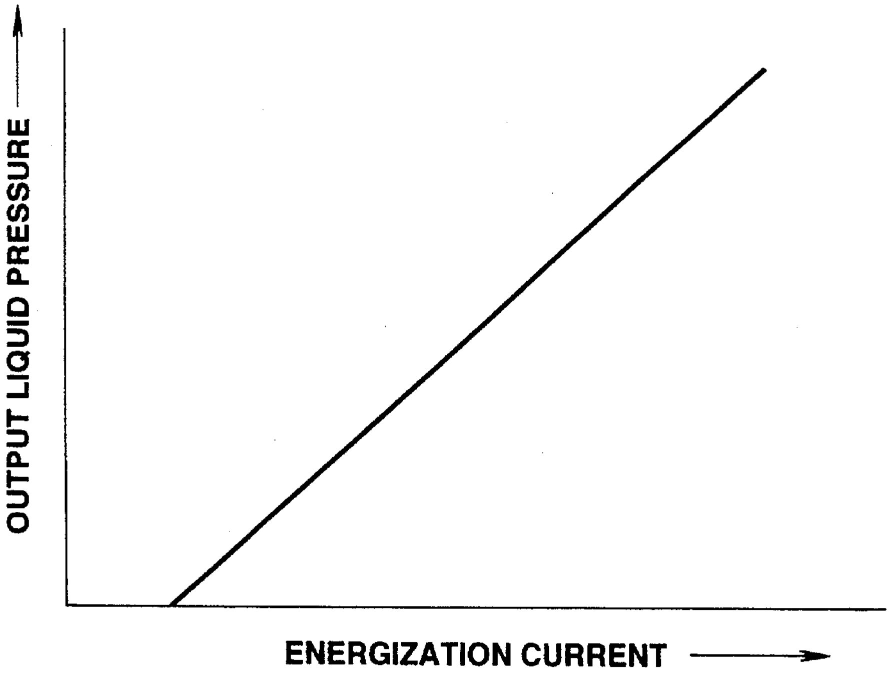
FIG. 4 is a graph of an output pressure characteristic of the hydraulic pressure control valve of FIG. 1 in relation to energization current of a solenoid.

As shown in FIGS. 2 and 3, a clearance "C" is provided between the shaft member 1 and the valve hole 4*a* for enabling smooth movement of the valve spool 4. Four pressure chambers 12 in the form of depressions are formed by cutting or notching in the outer circumferential surface of the larger diameter portion 11*a* of the shaft member 1. The pressure chambers 12 are arranged at constant circumferential intervals and communicated with the clearance "C". The pressure chambers 12 are in constant communication with the supply side communication hole 11*f* by way of the radial restriction hole 13.

In the meantime, the attracting member 58, the coil casing 52, the base 51 and the valve spool 4 are made of a magnetic material, so that by these members a magnetic loop is formed. The attracting member 58 has at an inner end a magnetic leakage portion 61 of a triangular cross section for producing a force for attracting the valve spool 4. The constituent parts except for the above described members made of a non-magnetic material, particularly, the constituent parts (for example, the shaft member 1, return spring 4*d*, intermediate cylinder 56, intermediate member 3, etc.) in contact with the above described members made of a non-magnetic material are made of aluminum (provided with surface treatment by alumite), stainless, etc. for thereby preventing disadvantages resulting from a magnetic field whilst preventing reduction of the magnetic efficiency of the solenoid 5.

That is, when the solenoid 5 is energized, it becomes possible to move the valve spool 4 in the left-hand direction against the bias of the return spring 4*d* and increase the hydraulic pressure at the output port 11*c*.

Then, the operation will be described.

(a) At the time of deenergization of solenoid:

Under the condition of the solenoid 5 being deenergized as shown in the lower half of FIG. 1, the valve spool 4 is urged in the right-hand direction under the bias of the return spring *4d*. Accordingly, the supply side variable restriction portion "s" is closed and the discharge side variable restriction portion "t" is opened, whereby the actuator "A" is communicated with the drain tank "T" by way of the variable restriction portion "t" to cause the hydraulic pressure within the actuator "A" to become equal to the atmospheric pressure.

(b) At the time of energization of solenoid:

When it begins to energize the solenoid 5, the valve spool 4 is attracted in the left-hand direction against the bias of the return spring 4*d* so that the discharge side variable restriction portion "t" is closed and the supply side variable restriction portion "s" is opened. Accordingly, the actuator "A" is communicated with the outside hydraulic pressure source 6 byway of the supply side variable restriction portion "s" whereby the output hydraulic pressure (hydraulic pressure at actuator "A") increases.

On the other hand, by the supply of an elevated output hydraulic pressure to the communication groove 4*b* of the valve spool 4 having the opposite side walls of different pressure receiving areas, a feedback force is produced that acts upon the valve spool 4 and urges the same in the right-hand direction, whereby the valve spool 4 is pushed backed in the right hand direction (in the direction to reduce the output hydraulic pressure). That is, the valve spool 4 is placed in the position where the attracting force of the solenoid 5 is balanced with the sum of the biasing force of the return spring 4*d* and the feedback force, that is, as shown in the characteristic diagram of FIG. 4, it becomes possible to supply an output hydraulic pressure proportional to the energization current of the solenoid 5 to the actuator "A".

(c) At the time of the valve spool being in an eccentric position:

As mentioned before, since it is necessary to form a predetermined clearance "C" between the valve hole 4*a* of the valve spool 4 and the outer circumferential surface of the shaft member 1 for enabling smooth sliding of the valve spool 4, there is a possibility that the valve spool 4 is moved radially into an eccentric position.

However, the larger diameter portion 11*a* of the shaft member 1 has at the outer circumferential surface the four pressure chambers 12 which are arranged at equal circumferential intervals, i.e., at equal intervals in the circumferential direction of the shaft member 1 and communicated with the clearance "C". The pressure chambers 12 are in constant communication with the supply side communication openings 11*f* by way of the radial restriction opening 13 and thus always in the condition of being supplied with the hydraulic pressure of the outside hydraulic pressure source 6. Accordingly, when the valve spool 4 is moved radially into an eccentric position, the clearance "C" comes to vary circumferentially of the shaft member 1 as for example shown in FIG. 3. By this, although the hydraulic pressure in the pressure chambers 12 in the place where the clearance "C" is small is maintained equal to the supply pressure from the pressure source 6, the hydraulic pressure in the pressure chambers 12 in the place where the clearance "C" is large becomes smaller than the supply pressure due to a large amount of leakage in that place. By this, a differential pressure in the radial direction is caused and acts upon the valve spool 4 to correct the eccentricity of the valve spool 4, i.e., the valve spool 4 is self-centered by the differential pressure.

As will be understood from the above, this embodiment produces effects enumerated as follows.

(1) By utilizing the supply pressure for operation of the hydraulic pressure control valve it becomes possible to prevent the valve spool 4 from being eccentric, i.e., it become possible for the valve spool to be self-centered at all times.

(2) Since the control valve portion and the magnetic path constituting portion can be formed on the inner side and the outer side of the valve spool 4 in such a manner as to be placed one upon another in the radial direction, the axial length of the valve spool 4 can be smaller. In this connection, the magnetism has such a character as to form a magnetic path on the outer circumferential side of the valve spool 4, i.e., in a larger area where the magnetic saturation is small. So, although the groove 4*b* constituting the control valve portion is formed in the inner circumferential surface of the valve spool 4, this does not exert any bad influence on the hydraulic pressure control.

(3) Since the control valve portion is formed in the inner circumferential portion of the valve spool 4 of a small diameter, the amount of leakage fluid can be small.

(4) Since the filters 9*a*, 9*b* are installed inside the fluid control valve *7a*, the system can be compact.

Figure 5:
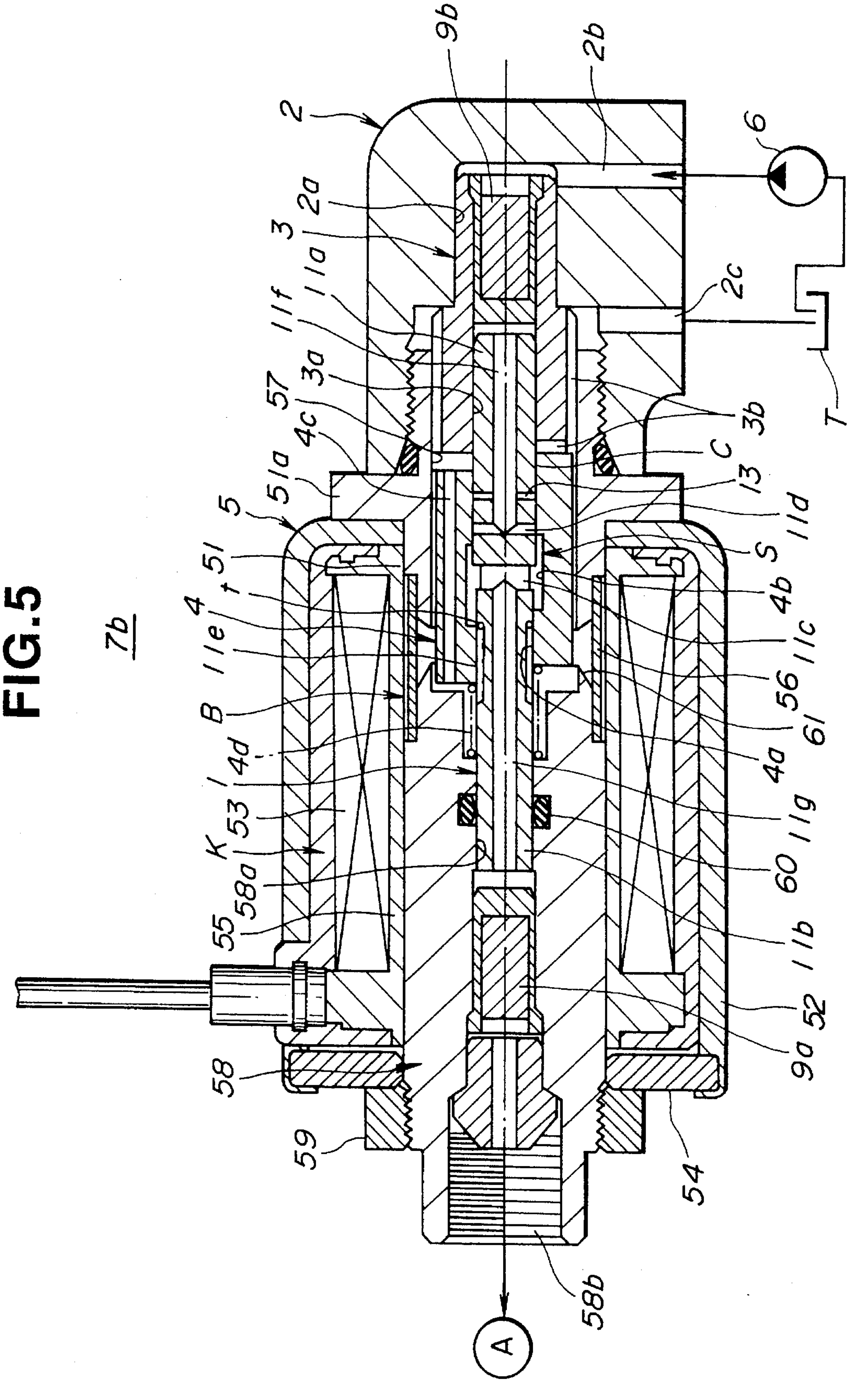
FIG. 5 is a view similar to FIG. 1 but shows another embodiment of the present invention.
Figure 6:
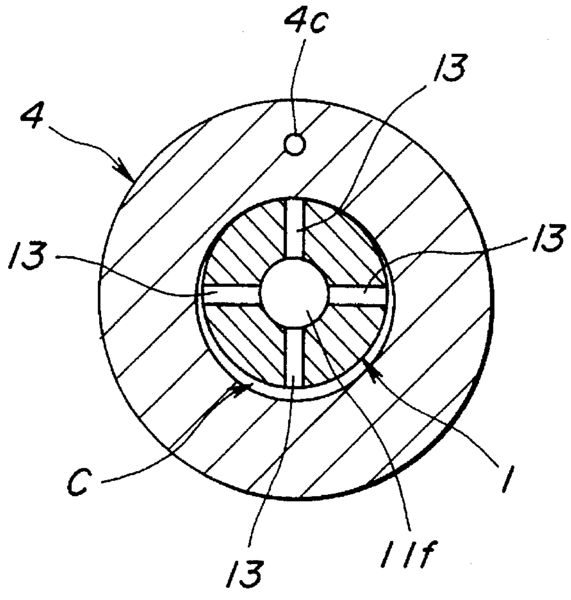
FIG. 6 is a view similar to FIG. 3 but shows a novel important portion of the hydraulic pressure control valve of FIG. 5.
Figure 7:
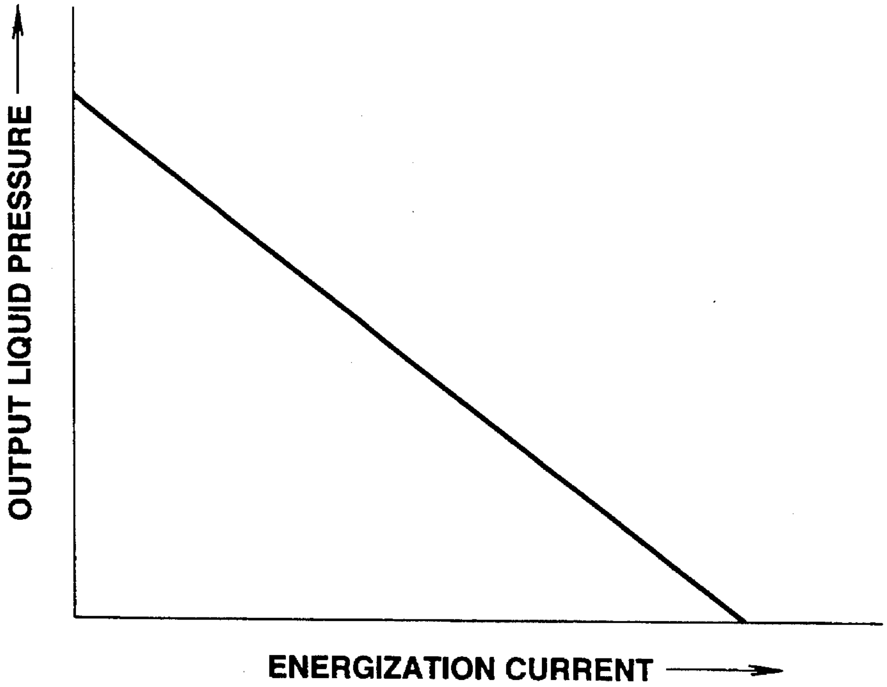
FIG. 7 is a graph of an output pressure characteristic of the hydraulic pressure control valve of FIG. 5 in relation to energization current of a solenoid.

FIGS. 5 to 7 show a fluid pressure control valve 7*b* according to another embodiment. This embodiment differs from the previous embodiment of FIGS. 1 to 4 in that the shaft member 1 and the valve spool 4 are each arranged reversely with respect to the axial direction thereof, i.e., the right side left and as a consequence the actuator "A" and the outside hydraulic pressure source 6 are connected reversely.

That is, as seen from FIG. 7, this embodiment differs from the previous embodiment of FIGS. 1 to 4 in that the directions of increase and decrease of the hydraulic pressure in response to energization and deenergization of the solenoid 5 are reverse to those of the previous embodiment, and the hydraulic pressure control valve 7*b* is a normally open valve.

Further, as seen from FIG. 6, the pressure chambers 12 in the previous embodiment of FIGS. 1 to 4 are omitted in this embodiment.

Except for the above, the fluid pressure control valve 7*b* of this embodiment is substantially similar to the previous embodiment of FIGS. 1 to 4 and can produce substantially the same effects.

Figure 8:
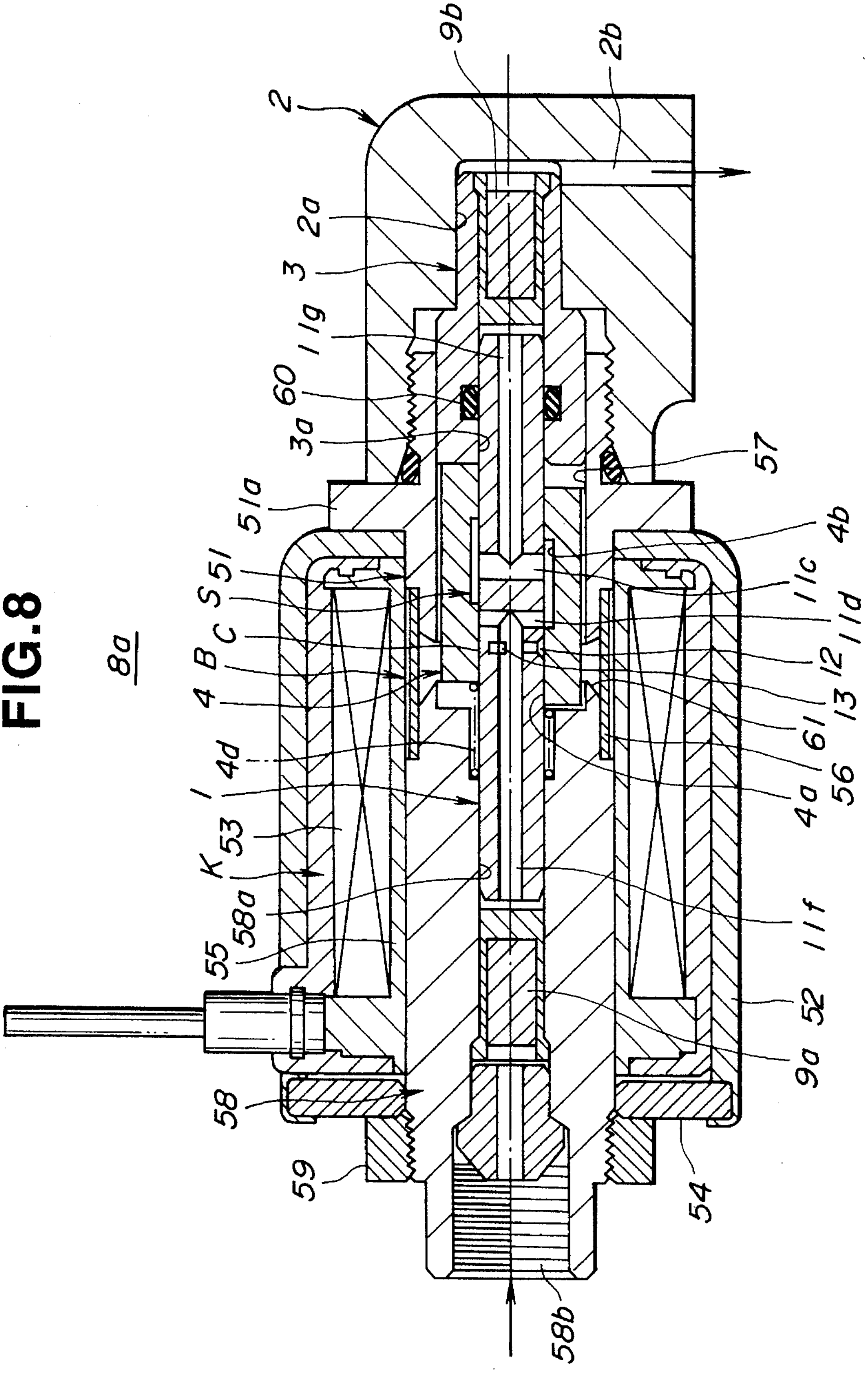
FIG. 8 is a view similar to FIG. 1 but shows a further embodiment of the present invention.
Figure 9:
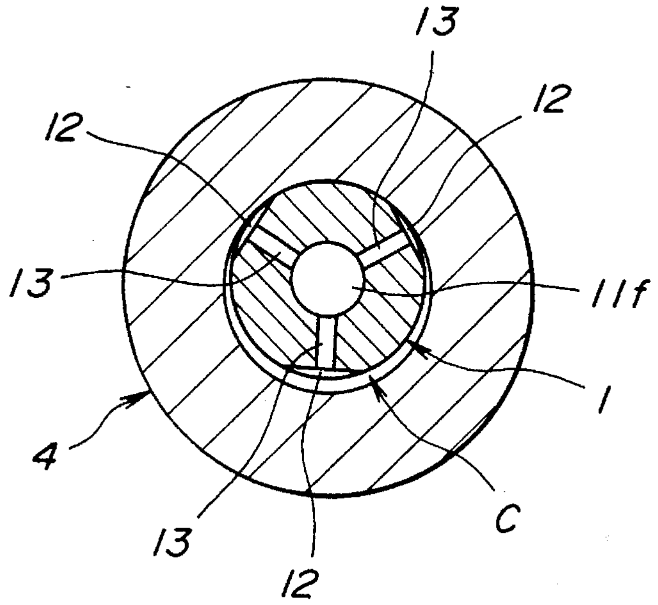
FIG. 9 is a view similar to FIG. 3 but shows a novel, important portion of the hydraulic pressure control valve of FIG. 8.
Figure 10:
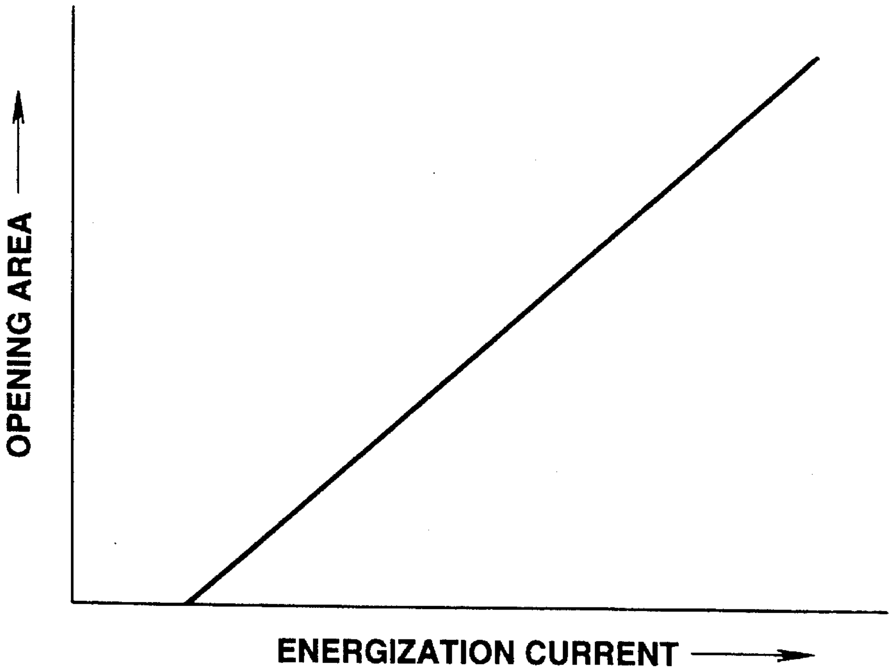
FIG. 10 is a graph of an output pressure characteristic of the hydraulic pressure control valve of FIG. 9 in relation to energization current of a solenoid.

FIGS. 8 to 10 show a flow control valve 8*a* embodying a fluid control valve of the present invention. This embodiment differs from the previous embodiment of FIGS. 1 to 4 in that the passages related to discharge of fluid and for connection to the drain tank T (i.e., discharge side variable restriction portion "t", discharge groove 11*e*, communication groove 3b, drain side connecting port 2*c*) are omitted for the reason of its nature and the external shape of the shaft member 1 and the internal shape of the valve spool 4 are formed into a straight cylindrical shape without any step and further, as shown in detail in FIG. 9, three pressure chambers 12 and three restriction holes 13 are provided.

The operation of this embodiment will be described.

(a) At the time of deenergization of solenoid:

When the solenoid 5 is in the condition of being deenergized, the valve spool 4 is put in the condition of being urged in the right-hand direction under the bias of the return spring *4d* as shown in the upper half of FIG. 8. Accordingly, the supply side variable restriction "s" is closed, whereby the flow rate of hydraulic fluid becomes zero.

(b) At the time of energization of solenoid:

When it begins to energize the solenoid 5, the valve spool 4 is attracted in the left-hand direction against the bias of the return spring 4*d* as shown in the lower half of FIG. 8. The opening degree of the supply side variable restriction portion "s" changes in proportion to the energization current of the solenoid 5 as shown in the characteristic diagram of FIG. 10, that is, the flow rate of hydraulic fluid can be controlled in proportion to the energization current.

Accordingly, this embodiment can produce substantially the same effects as the previous embodiment of FIGS. 1 to 4.

Figure 12:
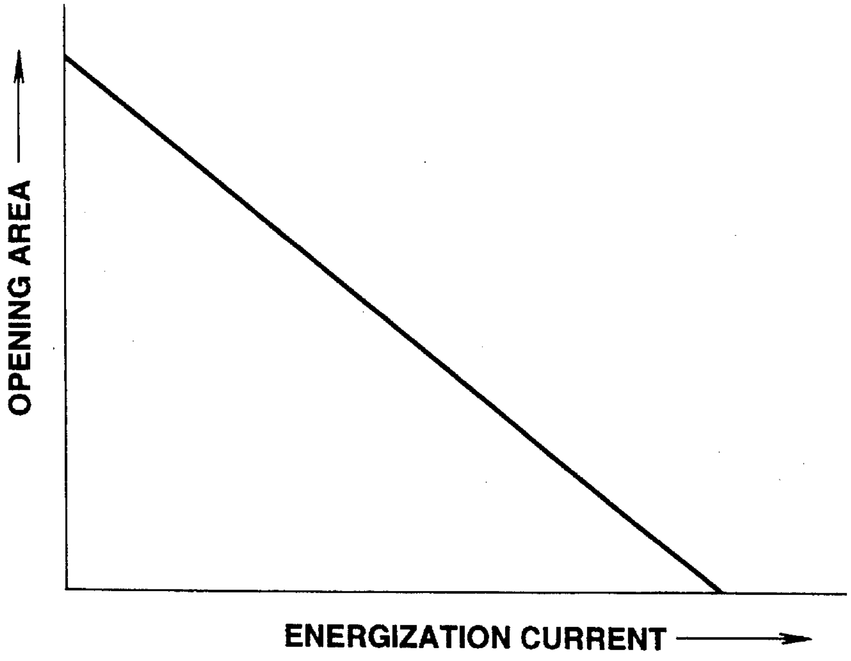
FIG. 12 is a graph of an output pressure characteristic of the hydraulic pressure control valve of FIG. 11 in relation to energization current of a solenoid.
Figure 11:
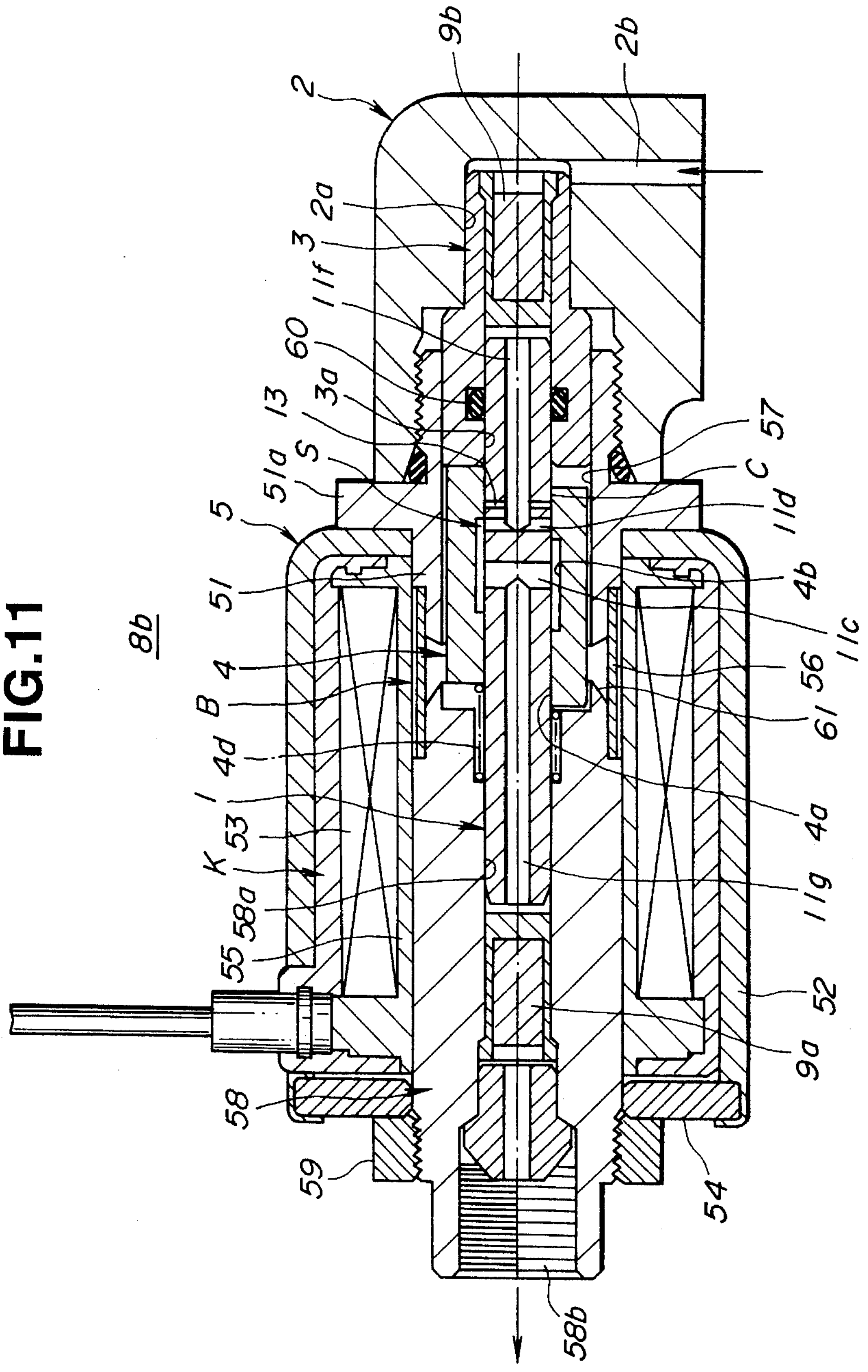
FIG. 11 is a view similar to FIG. 1 but shows a further embodiment.

FIGS. 11 and 12 show a flow control valve 8*b* according to another embodiment of this invention. This embodiment differs from the previous embodiment of FIGS. 8 to 10 in that the flow passage structure is reversed with respect to the axial direction thereof, i.e., the right side left and as a consequence the connection between the fluid supply side and the output side is reversed.

As seen from FIG. 12, this embodiment differs from the previous embodiment of FIGS. 8 to 10 in that the directions of increase and decrease of the flow rate of hydraulic fluid in response to the energizaion and deenergization of the solenoid 5 are reversal to those of the previous embodiment of FIGS. 8 to 10, and the flow control valve 8b of this embodiment is a normally open valve.

Except for the above, this embodiment are substantially similar to the previous embodiment of FIGS. 8 to 10 and can produce the same effects.

While the present invention has been described and shown as above, it is not for the purpose of limitation but various modifications and variations can be made within the scope of this invention.

For example, while it has been described and shown that the entire valve spool is made of a magnetic material and formed into an integral unit, only the outer circumferential portion serving as a plunger portion can be partially made of a magnetic material.

Further, while the embodiment has been described and shown in that the spool is constituted by a plunger which is driven by a solenoid, the present invention can be applied to such a case where the plunger is not used.

Further, while the embodiment has been described and shown in that the spool is provided to the outer circumferential side of the stationary side member, it can be provided to the inner circumferential side of the stationary side member.

What is claimed is:

1. A fluid control valve comprising:

a stationary shaft member having an axial fluid flow passage;

a hollow spool slidable on said stationary shaft member;

a control valve portion for controlling fluid flow through said fluid flow passage, said control valve portion being formed in a sliding portion where said stationary shaft member and said spool are slidingly engaged with each other by providing therebetween an annular clearance; and three or more radial communication holes formed in said shaft member for providing constant communication between said annular clearance and a portion of said fluid flow passage upstream of said control valve portion, said radial communication holes being arranged at equal intervals in the circumferential direction of said stationary shaft member.

2. A fluid control valve according to claim 1, wherein said spool is constituted by a plunger of a solenoid, said plunger being slidably installed on an outer circumferential surface of said shaft member.

3. A fluid control valve comprising:

a stationary shaft member having a coaxial fluid flow passage;

a hollow valve spool slidably installed on said stationary shaft member in such a manner as to provide an annular clearance between mating circumferential surfaces of said valve spool and said stationary shaft member and cooperating with said stationary shaft member to constitute therebetween control valve means for controlling fluid flow through said fluid flow passage; and three or more radial communication holes formed in said stationary shaft member for providing constant communication between said clearance and a portion of said fluid flow passage upstream of said control valve means, said communication holes being arranged at equal intervals in the circumferential direction of said stationary shaft member.

4. A fluid control valve according to claim 3, wherein said valve spool is constituted by a plunger of a solenoid.

5. A fluid control valve according to claim 4, wherein said fluid flow passage includes an axial inlet passage section, an axial outlet passage section, a first radial port connected to said inlet passage section, and a second radial port connected to said outlet passage section, said control valve means including an annular groove formed in an inner circumferential surface of said valve spool for controlling communication between said first and second radial ports.

6. A fluid control valve according to claim 5, wherein said radial communication holes are in constant communication with said inlet passage section.

7. A fluid control valve according to claim 5, wherein said shaft member has a drain passage in the form of a groove formed in the outer circumferential surface thereof, said groove of said valve spool controlling communication between said second radial port and said drain passage.

8. A fluid control valve according to claim 7, wherein said solenoid includes a solenoid body portion to which said shaft member is fixedly attached and in which said valve spool is slidably installed, and a coil portion removably installed on said solenoid body portion.

9. A fluid control valve according to claim 5, wherein said annular groove of said valve spool has opposite axial ends of different pressure receiving areas.

10. A fluid control valve according to claim 5, wherein said annular groove of said valve spool has opposite axial ends of the same pressure receiving areas.

11. A fluid control valve according to claim 3, wherein said shaft member has a plurality of pressure chambers in the form of depressions on an outer circumferential surface thereof, said radial communication holes being in constant communication with said pressure chambers, respectively.

* * * * *